No. 661,601. Patented Nov. 13, 1900.
C. G. FAWKES.
ELASTIC BICYCLE TIRE.
(Application filed May 22, 1900.)
(No Model.)
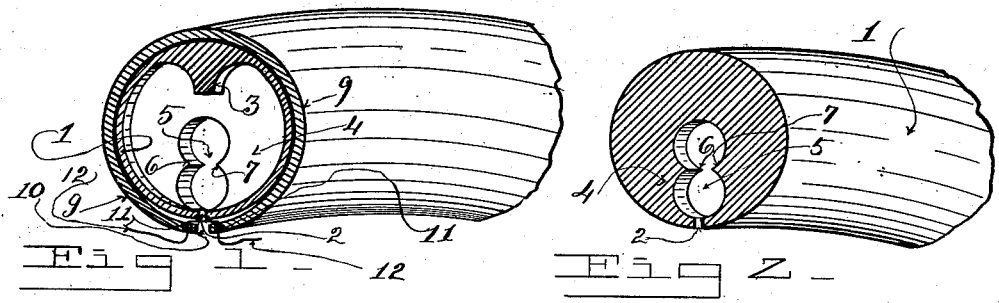
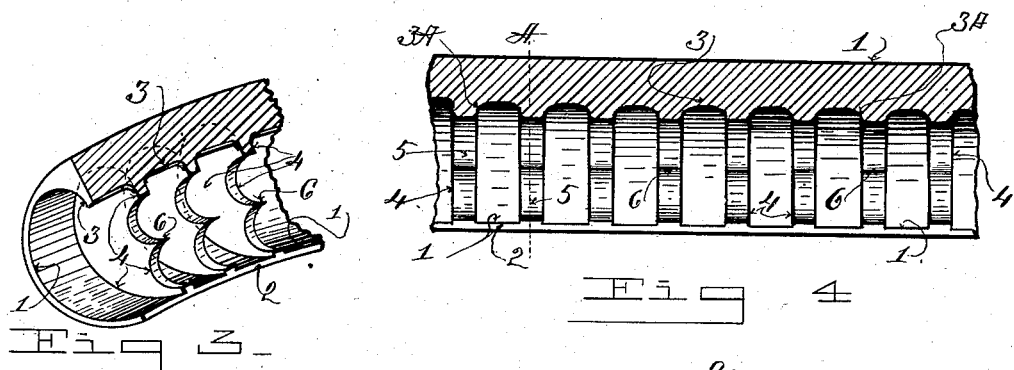
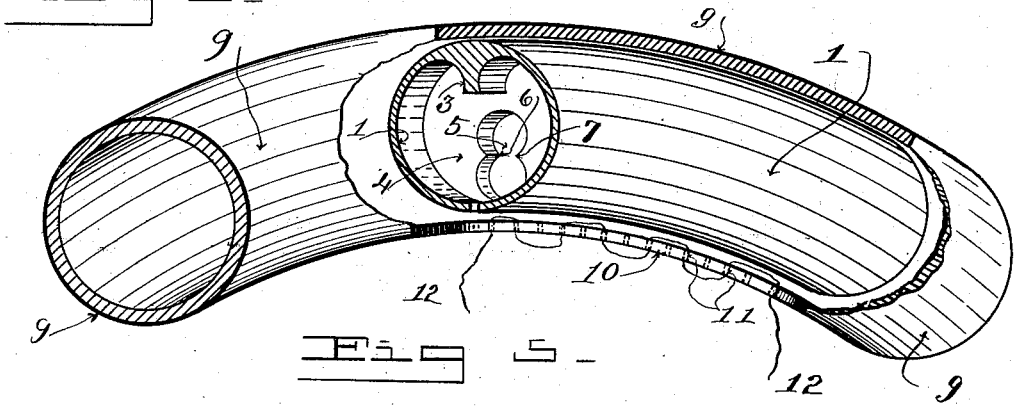
WITNESSES:
INVENTOR.
Charles G Fawkes
BY H. S. Bailey, ATTORNEY.

UNITED STATES PATENT OFFICE.

CHARLES G. FAWKES, OF DENVER, COLORADO.

ELASTIC BICYCLE-TIRE.

SPECIFICATION forming part of Letters Patent No. 661,601, dated November 13, 1900.

Application filed May 22, 1900. Serial No. 17,584. (No model.)

*To all whom it may concern:*

Be it known that I, CHARLES G. FAWKES, a citizen of the United States of America, residing at Denver, in the county of Arapahoe and State of Colorado, have invented certain new and useful Improvements in Elastic Bicycle-Tires; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in bicycle-tires; and the objects of my invention are, first, to provide an elastic tire; second, to provide a double-tube elastic tire; third, to provide an elastic tire that can be inserted in an outer covering, and, fourth, to provide a simple, durable, and inexpensive elastic tire. I attain these objects by the mechanism illustrated in the accompanying drawings, in which—

Figure 1 is a fragmentary sectional view of a tire embodying my invention. Fig. 2 is a sectional view on line A of Fig. 4 of a fragment of my elastic tire. Fig. 3 is a perspective fragment of a tire embodying my invention. Fig. 4 is a central section of a fragment of a tire embodying my invention; and Fig. 5 is a fragmentary section of my elastic tire in an outer tube, which may be the outer tube of the commonly-used pneumatic tire.

Similar figures of reference refer to similar parts throughout the several views.

Referring to the drawings, the numeral 1 designates the shell portion of my elastic tire, which is a separated tire. I preferably make this tire of rubber, although any other suitable material may be used. The shell of the tire contains a narrow open slot 2, formed throughout its length in its under side, which may be formed in it or may be made by cutting the tire after it is made. The slot divides the inner peripheral portion of the tire into two parts. Opposite the slot at the top or tread portion of the elastic tire the material of the shell depends in curved lines which blend from the inner periphery into the interior of the tube toward its axis a short distance, forming an introverted inner rib 3. This inner rib 3 extends throughout the length of the elastic tire. I arrange across the inner diameter of the tire disk portions 4, which are joined integrally with the shell and the rib 3 by round fillets 3ᴬ, or curved portions, which greatly assist the disks to support the tread portion. These disks are placed in the shell at short and at preferably equal distances apart throughout the length of the elastic tire. These disks are preferably made tapering radially from the center of the tire. Consequently they are slightly smaller at the inner periphery than at their junction with the pendent portion of the outer periphery, as shown in Fig. 3, in which the disks are drawn from a radial point, to which the inner and outer peripheries of the inner tire are concentric. Each one of these disks contains at its central portion a long hole 5, which is shaped substantially like the figure 8, which connects with the slot through the shell portion, thus dividing the inner tire into two equal parts from the top edge of these holes to the edges of the slot. The edge of the top of the hole of each disk is preferably placed at a short space below the lower edge of the depending ribs. The top and bottom portions of this hole 5 in each disk are preferably made round, and they intersect one another so near their peripheries that two oppositely-disposed points 6 and 7 of the rubber disks project into the long hole formed.

While Fig. 4 shows a fragment straightened out, the inner tire is vulcanized in a curved mold that will make it of substantially the same radius and diameter as the wheels it is to be used on. Around this elastic tire I place an outer tubular covering 9, which I term the "tread-tire."

The tread-tire 9 is a complete integral circular endless tube which is made of any suitable material. I preferably use for this tube, however, the outer tread-tubes of the double pneumatic tires in common use. A slit 10 is formed at some predetermined point in the inner periphery of the tire. In each edge of the tire formed by the slit suitable lacing-holes 11 are formed, in which a lacing 12 is placed, by which the edges of the slit may be laced together. The elastic tire is made to fit loosely but snugly in the outer tire and is inserted by unlacing the slit portion and spreading open the slit part and then inserting one end of the elastic tire and working it into the outer tire. If the elastic tire is too long, one end is cut off sufficient to allow its ends to join snugly together and fill the outer tube with a complete circle. The ends of the inner tire are then, if desired, cemented together and the slit closed by lacing up and tying the slit.

The operation of my elastic tire when on a wheel under the pressure of a rider is as follows: The depending inner rib forms a continuous solid tread under pressure, which, owing to its peculiar form, contains stiffness enough to form a tough and stable tread portion. The disks, owing to their being placed close together, support the tread portion, but yield resiliently through the longer transverse diameters of the larger top and bottom portions of the long holes in them.

The resilient cushion of the tire is very materially increased by the open slot throughout the inner periphery of the tire, which allows each side of the elastic tire a certain amount of independent movement from the opposite side, which enables the tire to adjust itself to side blows without throwing the entire tire to one side.

My elastic tire is very simple in construction, and with its covering runs smoothly, and it can be used by a rider having double-tube tires by removing his pneumatic inner tire and placing the elastic within the outer tube.

Having described my invention, what I claim as new, and desire to secure by Letters Patent, is—

1. In an elastic bicycle-tire, the combination with an endless-tread tire having a closable opening at a predetermined point in its inner periphery and an elastic tire adapted to be inserted through said closable opening and to fit in said outer tire and comprising a round, elastic shell having an internal depending rib at its tread portion, a plurality of disks extending across said shell throughout its length at short distances apart, an oblong hole in each of said disks extending from the inner edge of the said shell to near the said rib and having the inner periphery of said shell divided into two separate parts by a divisional opening extending through said shell into said oblong hole of each disk, substantially as described.

2. In an elastic bicycle-tire the combination of a round shell of elastic material molded to form a separate circular tire, a plurality of partitions a short distance apart throughout the length of said tire, a hole in each partition having its opposite ends round and of larger diameter than its center two oppositely-disposed points of each partition extending into the center of said oblong hole and having said tire divided and separated into two equal parts by a narrow slot or opening along its inner periphery through its shell into said hole, with a suitable endless covering having a closable entrance and adapted to admit and surround said elastic tire, substantially as described.

3. In an elastic bicycle-tire the combination with the outer endless-tread tire provided with a laced opening, of an inner elastic tire adapted to be admitted into said tread-tire through said laced opening and comprising a rubber shell having an internally-depending rib at its tread portion, a plurality of partitions integral with said shell extending across it at short distances apart, a hole in each of said partitions substantially like the figure 8, and a narrow slot through said shell along its inner periphery into said hole, substantially as described.

4. The combination in an elastic tire of the endless outer-tread tire, the entrance-opening in said tire, the lacing in said opening arranged to manually close said opening with the inner separated elastic tire comprising the rubber shell having a rib projecting toward its axis from the tread portion of its periphery, disk-shaped partitions formed integral with said shell and rib extending diametrically across said shell and at short distances apart throughout the length of said elastic tire, the round fillets at the junction of said partitions with said shell and rib, a hole in each of said disks and a narrow slot or cut through said shell along its inner periphery into said hole of each of said partitions arranged and adapted to divide the inner peripheral portion of said tire into two separate parts, substantially as described.

In testimony whereof I affix my signature in presence of two witnesses.

CHARLES G. FAWKES.

Witnesses:
SIDNEY WILLIAMS,
W. H. MOSES.